United States Patent
Chien (10) Patent No.: US 10,705,107 B2
(45) Date of Patent: Jul. 7, 2020

(54) ELECTRONIC DEVICE WITH WIND SPEED DETECTION FUNCTION AND WIND SPEED DETECTION METHOD

(71) Applicant: HON HAI PRECISION INDUSTRY CO., LTD., New Taipei (TW)

(72) Inventor: Cheng-Ching Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 364 days.

(21) Appl. No.: 15/869,038

(22) Filed: Jan. 12, 2018

(65) Prior Publication Data

US 2019/0154722 A1   May 23, 2019

(30) Foreign Application Priority Data

Nov. 17, 2017   (TW) .............................. 106140009 A (51) Int. Cl.
   *G01P 5/14*   (2006.01)
(52) U.S. Cl.
   CPC ...................... *G01P 5/14* (2013.01)
(58) Field of Classification Search
   CPC .......................................................... G01P 5/14
   See application file for complete search history.

(56) References Cited

U.S. PATENT DOCUMENTS

| 8,800,361 B1* | 8/2014 | Johnston | G01W 1/06 73/170.16 |
| 2005/0005695 A1* | 1/2005 | Corey | G01P 5/14 73/170.14 |
| 2015/0307202 A1* | 10/2015 | Crouch | B64D 43/00 73/147 |
| 2017/0307647 A1* | 10/2017 | Yan | G01P 5/14 |

* cited by examiner

*Primary Examiner* — Jennifer E Simmons
(74) *Attorney, Agent, or Firm* — ScienBiziP, P.C.

(57) ABSTRACT

A wind speed detection method for an electronic device includes detection of a first air pressure value in outside environment around the electronic device when an air hole of the electronic device is blocked. The electronic device can be aligned directly against a wind and a second air pressure value is detected in outside environment. A wind pressure value in the outside environment can be acquired according to a difference value between the first air pressure value and the second air pressure value. Value of wind speed in the outside environment can be established according to the wind pressure value and a relationship between the wind pressure value and the wind speed value.

13 Claims, 6 Drawing Sheets

Table 1

| Altitude (m) | Atmospheric pressure (hPa) |
|---|---|
| 0 | 1013 |
| 500 | 995 |
| 1000 | 976 |
| 1500 | 959 |
| 2000 | 942 |
| 2500 | 925 |
| 3000 | 908 |
| 3500 | 892 |
| 4000 | 875 |
| 4500 | 859 |
| 5000 | 843 |
| 6000 | 812 |
| 7000 | 782 |

FIG. 4

Table 2

| Wind speed (m/s) | Wind pressure (hPa) |
|---|---|
| 1.5 | 0.049 |
| 3.3 | 0.098 |
| 5.4 | 0.295 |
| 7.9 | 0.687 |
| 10.7 | 1.374 |
| 13.8 | 2.258 |
| 17.1 | 3.434 |
| 20.7 | 5.105 |
| 24.4 | 7.068 |
| 28.4 | 9.522 |
| 32.6 | 12.566 |
| 36.9 | 16.099 |
| 41.1 | 20.223 |

ELECTRONIC DEVICE WITH WIND SPEED DETECTION FUNCTION AND WIND SPEED DETECTION METHOD

CROSS-REFERENCE TO RELATED APPLICATIONS

This application claims priority to Taiwanese Patent Application No. 106140009 filed on Nov. 17, 2017, the contents of which are incorporated by reference herein.

FIELD

The subject matter herein generally relates to smart detection technology, and particularly to an electronic device with a wind speed detection function and a wind speed detection method.

BACKGROUND

Smart electronic devices, such as smart phones and tablet computers, are usually configured with different kinds of sensors, thus enhancing functional diversity of the smart electronic device. These sensors may be gravity sensors, pressure sensors, medical sensors, and others. When users take part in outdoor activities, it may be necessary to know about wind speed, however, the existing electronic devices lack a wind speed detection function.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Figure 1:
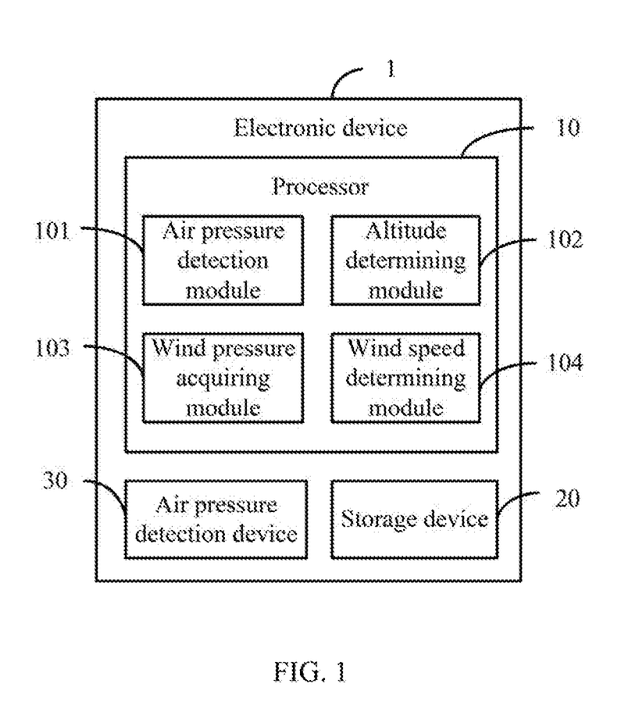
FIG. 1 is a block diagram of an exemplary embodiment of an electronic device with a wind speed detection function.

FIG. 1 illustrates an exemplary embodiment of an electronic device 1 with a wind speed detection function. The electronic device 1 includes, but is not limited to, a processor 10, a storage device 20, and an air pressure detection device 30. In at least one exemplary embodiment, the electronic device 1 can be a smart phone or a tablet computer. FIG. 1 illustrates only one example of the electronic device 1, other examples can include more or fewer components than illustrated, or have a different configuration of the various components in other exemplary embodiments.

In at least one exemplary embodiment, the storage device 20 can include various types of non-transitory computer-readable storage mediums. For example, the storage device 20 can be an internal storage system, such as a flash memory, a random access memory (RAM) for temporary storage of information, and/or a read-only memory (ROM) for permanent storage of information. The storage device 20 can also be an external storage system, such as a hard disk, a storage card, or a data storage medium. The processor 10 can be a central processing unit (CPU), a microprocessor, or other data processor chip that performs functions of the electronic device 1.

Figure 2:
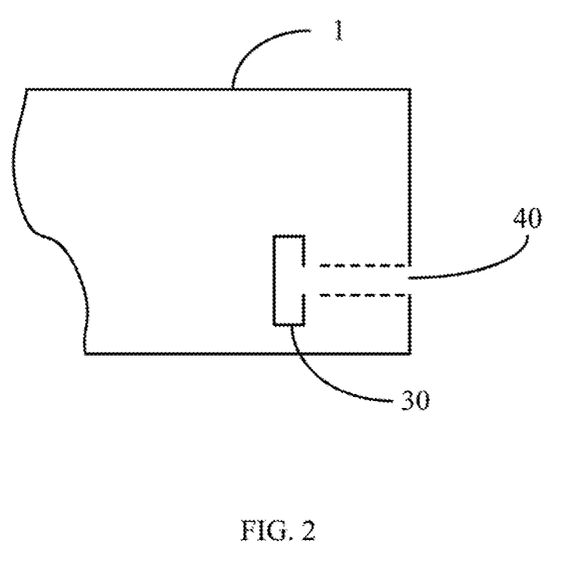
FIG. 2 is a schematic view illustrating a position of an air pressure detection device of the electronic device.

In at least one exemplary embodiment, the air pressure detection device 30 can be an air pressure sensor. Referring to FIG. 2, the air pressure detection device 30 is arranged in the electronic device 1. The electronic device 1 defines an air hole 40 in a position aligned to the air pressure detection device 30, thus the air pressure detection device 30 can be exposed out of the air hole 40, and open to the outside environment.

Figure 3:
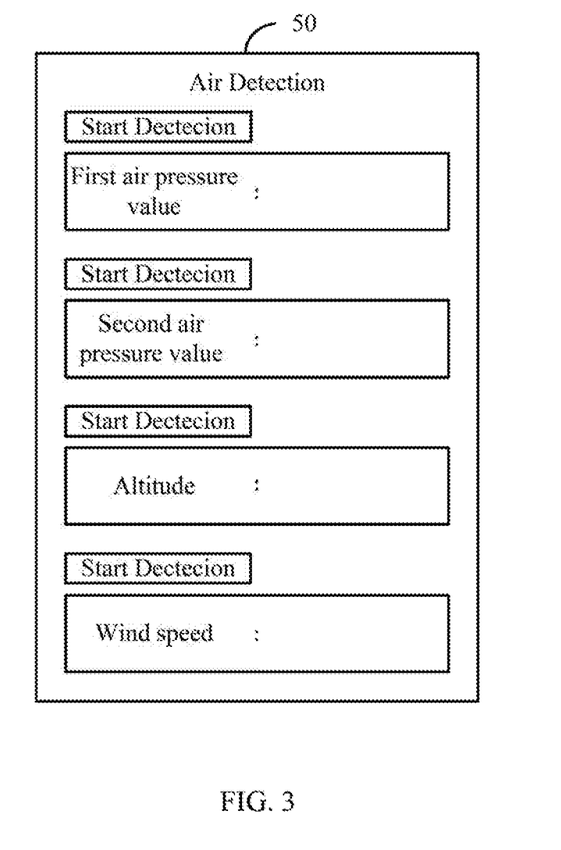
FIG. 3 is a schematic view illustrating an air detection interface of the electronic device.

Referring to FIG. 3, the electronic device 1 further provides an air detection interface 50. The air detection interface 50 is used for displaying air detection items, air detection options, and air detection data. In at least one exemplary embodiment, the air detection items at least include air pressure, altitude, and wind speed.

As illustrated in FIG. 1, the electronic device 1 includes an air pressure detection module 101, an altitude determining module 102, a wind pressure acquiring module 103, and a wind speed determining module 104. The modules 101-104 can be collections of software instructions stored in the storage device 20 of the electronic device 1 and executed by the processor 10. The modules 101-104 also can include functionality represented as hardware or integrated circuits, or as software and hardware combinations, such as a special-purpose processor or a general-purpose processor with special-purpose firmware.

When the air hole 40 is blocked by a user, the air pressure detection module 101 controls the air pressure detection device 30 to detect a first air pressure value in the outside environment.

In at least one exemplary embodiment, the user can block the air hole 40 by fingers or other objects, thus avoiding external factors interfering with the air pressure detection device 30.

In detail, as illustrated in FIG. 3, the user can also activate the air detection interface 50. When the air hole 40 is blocked, the user can select the air detection options to activate the air detection items. In other exemplary embodiments, the electronic device 1 further includes at least one light sensor (not shown). The at least one light sensor is arranged in the electronic device 1 near to the air hole 40. When the at least one light sensor does not detect light, the air hole 40 is deemed blocked, the electronic device 1 can automatically activate the air detection interface 50, and detect the air detection items one by one.

The altitude determining module 102 is used to determine an altitude value of location of the electronic device 1 according to the first air pressure value detected by the air pressure detection device 30.

Figure 4:
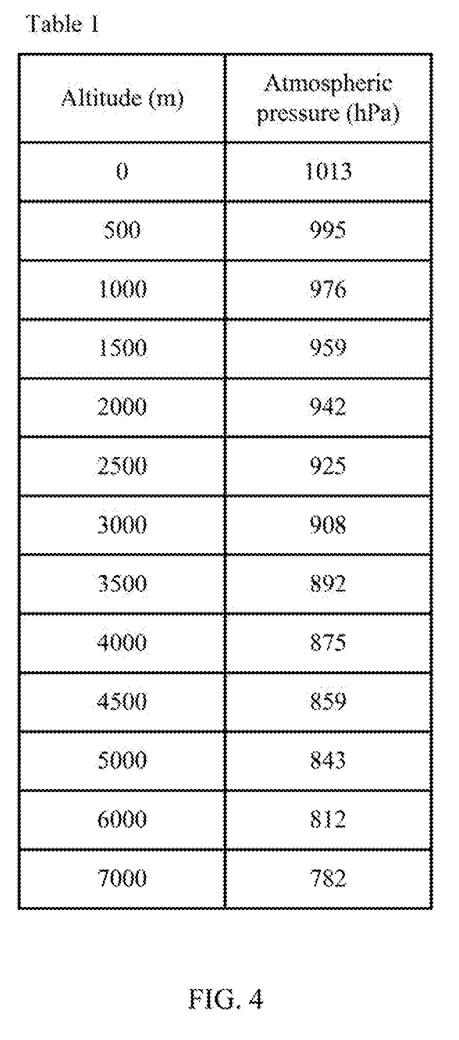
FIG. 4 is a comparison table illustrating a relationship between air pressure values and altitude values in an exemplary embodiment.

Referring to FIG. 4, in at least one exemplary embodiment, the storage device 20 stores a comparison table of a relationship between air pressure values and altitude values. The altitude determining module 102 can determine the altitude value of the location of the electronic device 1, according to the comparison table between the air pressure values and the altitude values.

For example, as illustrated in FIG. 4, when the first air pressure value detected by the air pressure detection device 30 is 976 hPa, the altitude determining module 102 can determine that the altitude value of the location of the electronic device 1 is 1000 meters above sea level.

In other exemplary embodiments, the relationship between the air pressure values and the altitude values is governed by equation (1) as follows:

$$H = 18400\left(1 + \frac{T}{273}\right)lg\frac{P}{P_0} \quad (1)$$

In the equation (1), H is the altitude value, P is the air pressure value, T is a temperature value in the outside environment, and $P_0$ is a standard air pressure value which is equal to 1013.25 hPa. The altitude determining module 102 can acquire the temperature value through a temperature sensor (not shown) or a current weather forecast. The altitude determining module 102 can determine the altitude value of the location of the electronic device 1 according to the first air pressure value, the temperature value, and the equation (1).

When the air hole 40 is aligned against a wind, the air pressure detection module 101 is further used to control the air pressure detection device 30 to detect a second air pressure value in the outside environment.

As illustrated in FIG. 2, the air pressure detection device 30 being perpendicular to the wind direction, the air pressure detection device 30 is totally exposed to the wind. In the exemplary embodiment, the second air pressure value is a summation of the static air pressure of the location of the electronic device 1 and a wind pressure value.

The wind pressure acquiring module 103 is used to acquire the wind pressure value in the outside environment, according to a difference value between the first air pressure value and the second air pressure value detected by the air pressure detection device 30.

In at least one exemplary embodiment, the wind pressure value is $P_2$, equal to the wind pressure value, the first air pressure value, and the second air pressure as set out in equation (2) as follows:

$$P_2 = P_1 - P \quad (2)$$

In the equation (2), $P_1$ is the second air pressure value, and P is the first air pressure value (i.e. atmospheric pressure).

The wind speed determining module 104 determines a wind speed value in the outside environment, according to the wind pressure value and a relationship between the wind pressure value and the wind speed value.

Figure 5:
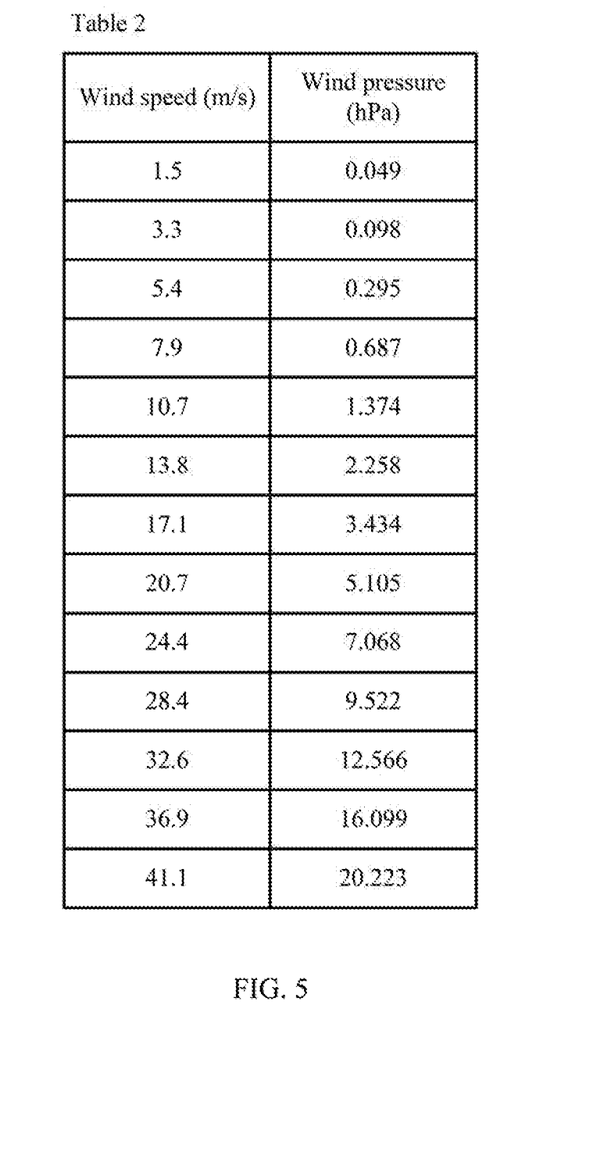
FIG. 5 is a comparison table illustrating a relationship between wind pressure values and wind speed values in an exemplary embodiment.

In at least one exemplary embodiment, referring to FIG. 5, the storage device 20 further stores a comparison table of a relationship between the wind pressure value and the wind speed value. The wind speed determining module 104 can determine the wind speed value in the outside environment according to the comparison table between the wind pressure value and the wind speed value.

For example, as illustrated in FIG. 5, when the wind pressure value detected by the wind pressure acquiring module 103 is 2.25 hPa, the wind speed determining module 104 can determine that the wind speed value in the outside environment is 13.8 meters per second.

In other exemplary embodiments, the relationship between the wind pressure value and the wind speed value is governed by equation (3) as follows:

$$V = \sqrt{\frac{2P_2}{\rho}} \quad (3)$$

In the equation (3), V is the wind speed value, $P_2$ is the wind pressure value, and $\rho$ is an air density in the outside environment. The electronic device 1 can acquire the air density through a density sensor (not shown). The electronic device 1 can also calculate the air density by applying the following equation (4):

$$\rho = \frac{P}{RT} \quad (4)$$

In the equation (4), P is the first air pressure value, R is a gas constant of the air and equal to 287, and T is the temperature in the outside environment. The wind speed determining module 104 can determine the wind speed value in the outside environment according to the wind pressure value, the air density, and the equation (3).

Figure 6:
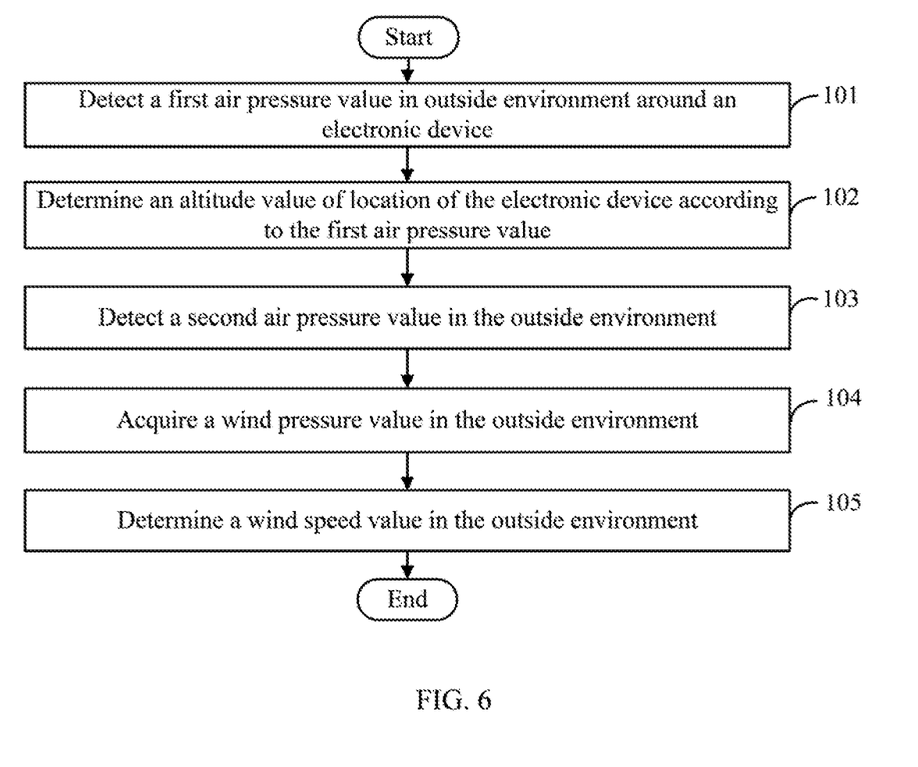
FIG. 6 illustrates a flowchart of an exemplary embodiment of a wind speed detection method.

FIG. 6 illustrates a flowchart of an exemplary embodiment of a wind speed detection method. The method is provided by way of example, as there are a variety of ways to carry out the method. The method described below can be carried out using the configurations illustrated in FIG. 1, for example, and various elements of these figures are referenced in explaining the example method. Each block shown in FIG. 6 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, when an air hole of an electronic device is blocked by a user, an air pressure detection module controls an air pressure detection device to detect a first air pressure value in outside environment (around the electronic device).

At block 102, an altitude determining module determines an altitude value of location of the electronic device according to the first air pressure value detected by the air pressure detection device.

As illustrated in FIG. 3, in at least one exemplary embodiment, a storage device of the electronic device stores a comparison table of a relationship between air pressure values and altitude values. The altitude determining module determines the altitude value of the location of the electronic device according to the comparison table.

In other exemplary embodiments, the relationship between the air pressure values and the altitude values is governed by equation:

$$H = 18400\left(1 + \frac{T}{273}\right) lg \frac{P}{P_0} \quad \text{(Eq 1)}$$

In Eq1, H is the altitude value, P is the air pressure value, T is a temperature value in the environment of the electronic device, and $P_0$ is a standard air pressure value which is equal to 1013.25 hPa. The altitude determining module can acquire the temperature value through a temperature sensor (not shown) or a current weather forecast. The altitude determining module can determine the altitude value of the location of the electronic device according to the first air pressure value, the temperature value, and Eq1.

At block 103, when the air hole is aligned directly against a wind, the air pressure detection module further controls the air pressure detection device to detect a second air pressure value in the outside environment.

At block 104, a wind pressure acquiring module acquires a wind pressure value in the outside environment according to a difference value between the first air pressure value and the second air pressure value detected by the air pressure detection device.

In at least one exemplary embodiment, the wind pressure value $P_2$ is equal to the wind pressure value, the first air pressure value, and the second air pressure according to:

$$P_2 = P_1 - P \quad \text{(Eq2)}$$

In Eq2, $P_1$ is the second air pressure value, and P is the first air pressure value (i.e. atmospheric pressure).

At block 105, a wind speed determining module determines a wind speed value in the outside environment according to the wind pressure value and a relationship between the wind pressure value and the wind speed value.

In at least one exemplary embodiment, as illustrated in FIG. 5, the storage device further stores a comparison table of a relationship between the wind pressure values and wind speed values. The wind speed determining module can determine the wind speed value in the outside environment according to such comparison table.

In other exemplary embodiments, the relationship between the wind pressure value and the wind speed value can be defined as follows:

$$V = \sqrt{\frac{2P_2}{\rho}} \quad \text{(Eq 3)}$$

In Eq3, V is the wind speed value, $P_2$ is the wind pressure value, and ρ is an air density in the outside environment. The electronic device can acquire the air density through a density sensor (not shown). The electronic device can also calculate the air density by applying the following equation:

$$\rho = \frac{p}{RT} \quad \text{(Eq 4)}$$

In Eq4, P is the first air pressure value, R is a gas constant of the air and equal to 287, and T is the temperature in the outside environment. The wind speed determining module 104 can determine the wind speed value in the outside environment according to the wind pressure value, the air density, and the Eq3.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device with a wind speed detection function comprising:
   at least one processor;
   an air pressure detection device coupled to the at least one processor; and
   a storage device coupled to the at least one processor and storing instructions for execution by the at least one processor to cause the at least one processor to:
   control, when an air hole of the electronic device is blocked, the air pressure detection device to detect a first air pressure value in outside environment;
   control, when the air hole is aligned against a wind, the air pressure detection device to detect a second air pressure value in the outside environment;
   acquire a wind pressure value in the outside environment according to a difference value between the first air pressure value and the second air pressure value; and
   determine a wind speed value in the outside environment according to the wind pressure value and a relationship between the wind pressure value and the wind speed value.

2. The electronic device according to claim 1, wherein the storage device stores a comparison table of a relationship between the wind pressure values and wind speed values, and the at least one processor is further caused to:
   determine the wind speed value in the outside environment according to the comparison table between the wind pressure values and the wind speed values.

3. The electronic device according to claim 1, wherein the relationship between the wind pressure value and the wind speed value is governed by an equation:

$$V = \sqrt{\frac{2P_2}{\rho}},$$

in the equation, V is the wind speed value, $P_2$ is the wind pressure value, and $\rho$ is an air density in the outside environment, and the at least one processor is caused to:
determine the wind speed value in the outside environment according to the wind pressure value, the air density, and the equation.

4. The electronic device according to claim 1, wherein the at least one processor is further caused to:
determine an altitude value of location of the electronic device according to the first air pressure value.

5. The electronic device according to claim 4, wherein the storage device stores a comparison table of a relationship between air pressure values and altitude values, and the at least one processor is caused to:
determine the altitude value of the location of the electronic device according to the comparison table between air pressure values and altitude values.

6. The electronic device according to claim 4, wherein the relationship between the air pressure values and the altitude values is governed by an equation:

$$H = 18400\left(1 + \frac{T}{273}\right)lg\frac{P}{P_0},$$

in the equation, H is the altitude value, P is the air pressure value, T is a temperature value in the outside environment, and $P_0$ is a standard air pressure value, and the at least one processor is caused to:
determine the altitude value of the location of the electronic device according to the first air pressure value, the temperature value, and the equation.

7. The electronic device according to claim 1, wherein the electronic device further provides an air detection interface, which is used for displaying air detection items, air detection options, and air detection data.

8. A wind speed detection method comprising:
when an air hole of an electronic device is blocked, detecting a first air pressure value in outside environment;
when the air hole is aligned against a wind, detecting a second air pressure value in the outside environment;
acquiring a wind pressure value in the outside environment according to a difference value between the first air pressure value and the second air pressure value; and
determining a wind speed value in the outside environment according to the wind pressure value and a relationship between the wind pressure value and the wind speed value.

9. The method according to claim 8, wherein the step of determining a wind speed value in the outside environment comprises:
determining the wind speed value in the outside environment according to a comparison table between the wind pressure values and the wind speed values.

10. The method according to claim 8, wherein the relationship between the wind pressure value and the wind speed value is governed by an equation:

$$V = \sqrt{\frac{2P_2}{\rho}},$$

in the equation, V is the wind speed value, $P_2$ is the wind pressure value, and $\rho$ is an air density in the outside environment, and the step of determining a wind speed value in the outside environment comprises:
determining the wind speed value in the outside environment according to the wind pressure value, the air density, and the equation.

11. The method according to claim 8, further comprising:
determining an altitude value of location of the electronic device according to the first air pressure value.

12. The method according to claim 11, wherein the step of determining an altitude value of location of the electronic device comprises:
determining the altitude value of the location of the electronic device according to a comparison table between air pressure values and altitude values.

13. The method according to claim 11, wherein the relationship between the air pressure values and the altitude values is governed by an equation:

$$H = 18400\left(1 + \frac{T}{273}\right)lg\frac{P}{P_0},$$

in the equation, H is the altitude value, P is the air pressure value, T is a temperature value in the outside environment, and $P_0$ is a standard air pressure value, and the step of determining an altitude value of location of the electronic device comprises:
determining the altitude value of the location of the electronic device according to the first air pressure value, the temperature value, and the equation.

* * * * *